United States Patent [19]

Cameron et al.

[11] Patent Number: 5,258,337

[45] Date of Patent: Nov. 2, 1993

[54] REACTION PROCESSING OF ALN/B₄C COMPOSITES

[75] Inventors: Craig P. Cameron, Ellicott City; John W. Lau, Gaithersburg, both of Md.

[73] Assignee: W. R. Grace & Co.-Conn., New York, N.Y.

[21] Appl. No.: 900,627

[22] Filed: Jun. 18, 1992

[51] Int. Cl.⁵ .................... C04B 35/56; C04B 35/58
[52] U.S. Cl. ..................................... 501/87; 264/332
[58] Field of Search ........................... 501/87; 264/332

[56] References Cited

U.S. PATENT DOCUMENTS

| | | | |
|---|---|---|---|
| 2,886,454 | 5/1959 | Todd | 501/87 |
| 4,565,907 | 6/1986 | Takashashi et al. | 200/19 |
| 4,605,440 | 8/1986 | Halverson et al. | 501/87 |
| 4,800,065 | 1/1989 | Christodoulou et al. | 420/129 |
| 4,851,262 | 7/1989 | McFeaters | 501/87 |
| 4,879,262 | 11/1989 | Halverson et al. | 501/87 |
| 4,882,304 | 11/1989 | Novich et al. | 501/32 |
| 4,891,341 | 1/1990 | Cutler et al. | 501/89 |
| 5,120,684 | 6/1992 | Wang | 501/87 |
| 5,164,345 | 11/1992 | Rice et al. | 501/87 |

*Primary Examiner*—Mark L. Bell
*Assistant Examiner*—Deborah Jones
*Attorney, Agent, or Firm*—Steven Capella

[57] ABSTRACT

Ceramics containing AlN and B₄C are produced from relatively low cost starting materials. The starting materials are combined and heated whereby they react to form AlN and B₄C. The reacted mixture can optionally be densified thereafter. The starting materials generally include aluminum metal, boron nitride and carbon.

9 Claims, No Drawings

REACTION PROCESSING OF ALN/B₄C COMPOSITES

BACKGROUND OF THE INVENTION

Structural ceramic materials generally show many advantages in high performance materials applications because of their high mechanical strength and hardness properties and low weight. These features make many of these ceramic materials attractive for use in many applications.

Unfortunately, a major disadvantage of most structural ceramic materials is high cost. High cost has limited the use of these materials.

The high cost of many structural ceramics may be partly attributed to high cost of the starting ceramic powders which are to be shaped and densified to form structural ceramic parts. The starting powders are often made by energy-intensive processes or by other expensive methods adapted to produce high purity starting powders. Generally, it has been preferred to minimize the impurity contents of starting powders in order to maximize the performance of the ultimate ceramic part.

Some prior art processes have used chemical reactions in the formation of ceramic composites. In U.S. Pat. No. 4,879,262, B₄C-TiB₂ composites were prepared by forming a powder compact containing B, C, and Ti or hydride or oxide powders thereof. The mixture was then combusted to yield a B₄C-TiB₂. The reactants used in that process still entail substantial cost.

Needless to say, it would be highly desirable to reduce these costs associated with structural ceramics. Indeed, reduction of cost is necessary if structural ceramics are to be used in broader applications.

SUMMARY OF THE INVENTION

The present invention overcomes some of the problems of high cost structural ceramics by providing a low cost method for producing ceramics containing $B_4C$ and AlN from low cost starting materials.

In one aspect, the invention encompasses a method of forming compositions containing aluminum nitride and boron carbide, said method comprising:
(a) combining sources of boron nitride, aluminum and carbon to form a mixture, and
(b) heating said mixture, whereby said mixture reacts to form aluminum nitride and boron carbide.

In a further aspect, the invention encompasses a method of forming a sintered ceramic composition containing aluminum nitride and boron carbide, said method comprising:
(a) combining sources of boron nitride, aluminum, and carbon to form a mixture,
(b) compacting said mixture to form a shape,
(c) heating said shape, whereby said sources react to form aluminum nitride and boron carbide, and
(d) sintering said reacted shape.

The invention also encompasses compositions based on AlN and $B_4C$.

DETAILED DESCRIPTION OF THE INVENTION

In the process of the invention, sources of boron nitride, aluminum, and carbon are combined to form a mixture. The mixture may optionally be shaped or compacted. The mixture is then heated, whereby the following reaction takes place:

$$4 BN + (x)Al + C \rightarrow (x)AlN + B_4C + \frac{(4-x)}{2} N_2 \uparrow$$

where x is between 0 and 4.

Other reactions may also take place depending on the overall composition of the mixture, the reaction conditions and other factors. The resultant reacted composition may then be further treated to form a densified body using any conventional technique such as hot pressing, hot isostatic pressing, etc.

The boron nitride source can be any material capable of providing boron nitride for reaction with aluminum and carbon without providing undesirable amounts of other materials or reactants. A preferred source is simply boron nitride powder. Similarly, the aluminum and carbon sources may be any materials which provide those reactants while not providing undesirable amounts of other materials or reactants. A preferred aluminum source is aluminum powder. Preferred carbon sources may be elemental carbon powder such as carbon black and carbonizable polymeric precursors.

The mixture proportions may be varied from the stoichiometry recited above. In general, x is preferably about 3–4, yielding a product containing about 68–74.5 wt. % AlN based on the total of AlN and $B_4C$. Other materials such as sintering aids or volatilizable binders may also be included in the mixture. Example of suitable sintering aids are CaO, $Y_2O_3$ etc. Preferably, the amount of sintering aids used is less than about 20 wt. % based on the total of $B_4C$ and AlN in the sintered product.

The reactants may be combined by any conventional technique such as milling. It is preferable that water be avoided as a mixing medium because it undesirably reacts with boron nitride. The mixture may be shaped or compacted by any conventional technique such as pressing, extrusion or injection molding.

The mixture is heated to cause the above reaction to occur. Generally, a temperature of about 1600° C. or higher is required for the reaction to proceed to completion. Pressure may optionally be applied to the mixture during the reaction. A preferred pressure is at least about 1000 psi. The atmosphere is preferably nitrogen or an inert gas atmosphere. A 250 mm Hg nitrogen atmosphere is preferred.

Once the reaction has taken place, the resultant composition may be further treated to densify the material. Densification can be performed as a continuation of the reaction heating or may be an entirely separate step. Any known effective densification method can be used. Hot pressing or hot isostatic pressing are generally preferred. For hot pressing, preferred conditions include heating to at least about 1600° C. at about 1000 psi or greater for about one hour.

The following example is presented to illustrate an embodiment of the invention. It should be understood that the invention is not limited to the specifics of this example.

EXAMPLE

An initial reactant mixture was prepared by combining BN, Al and C powders in proportions approximately corresponding to the reaction:

$$4 BN + 4 Al + C \rightarrow 4 AlN + B_4C.$$

The powders were wet milled for about one hour in isopropanol using 3/16" diameter $Si_3N_4$ balls as the milling media. The mixture was dried under vacuum at 50° C. for about 24 hours. The dried powder mixture was loaded into a graphite die and placed into a hot press apparatus.

The mixture was heated to 600° C. under vacuum at 10° C./min. 250 mm Hg of $N_2$ was then added to the chamber and heating was continued at 10° C./min to 900° C. Heating continued to 1500° C. at 5° C./min. Then, an axial pressure of about 3000 psi was applied and heating was continued at 5° C./min to 1800° C. The conditions were then held constant for about one hour. Then, the pressure was removed and the densified piece was allowed to cool in situ to yield a densified $AlN/B_4C$ composite.

What is claimed is:

1. A method of forming compositions containing aluminum nitride and boron carbide, said method comprising:
   (a) combining sources of boron nitride, aluminum and carbon to form a mixture, and
   (b) heating said mixture, whereby said mixture reacts to form aluminum nitride and boron carbide said reacting including the reaction;

$$4 BN + (x)Al + C \rightarrow (x)AlN + B_4C + (4-x)/2 N_2 \uparrow$$

where x is between 0 and 4.

2. The method of claim 1 wherein said mixture is compacted prior to said heating.

3. The method of claim 2 wherein said heating is done to a temperature of at least 1600° C.

4. The method of claim 2 wherein said sources consist essentially of boron nitride, aluminum metal, and free carbon.

5. A method of forming a sintered ceramic composition containing aluminum nitride and boron carbide, said method comprising:
   (a) combining sources of boron nitride, aluminum and carbon to form a mixture,
   (b) compacting said mixture to form a shape,
   (c) heating said shape, whereby said sources react to form aluminum nitride and boron carbide said reacting including the reactions:

$$4 BN + (x)AL + C \rightarrow (x)AlN + B_4C + (4-x)/2 N_2 \uparrow$$

where x is between 0 and 4, and
   (d) sintering said reacted shape.

6. The method of claim 5 wherein said sources consist essentially of boron nitride, aluminum metal, and elemental carbon respectively.

7. The method of claim 5 wherein said sintering is performed by hot pressing.

8. The method of claim 5 wherein said sintering is performed by pressureless sintering.

9. The method of claim 5 wherein said heating is done to a temperature of at least 1600° C.

* * * * *